Sept. 22, 1959
C. L. GOLDTRAP
2,904,794
TOILET FLUSH VALVE ASSEMBLY
Filed Aug. 19, 1957
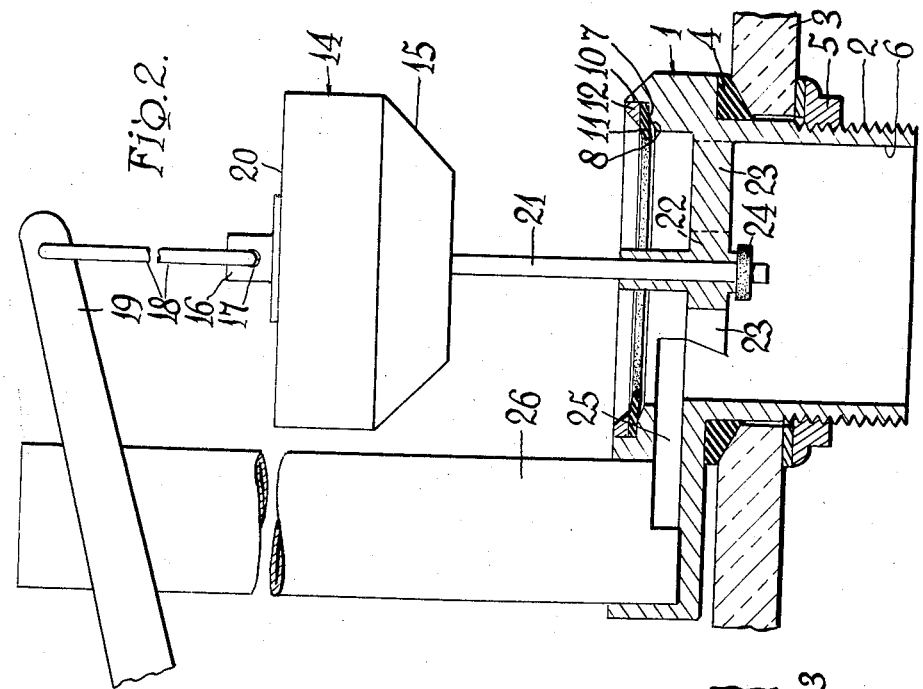
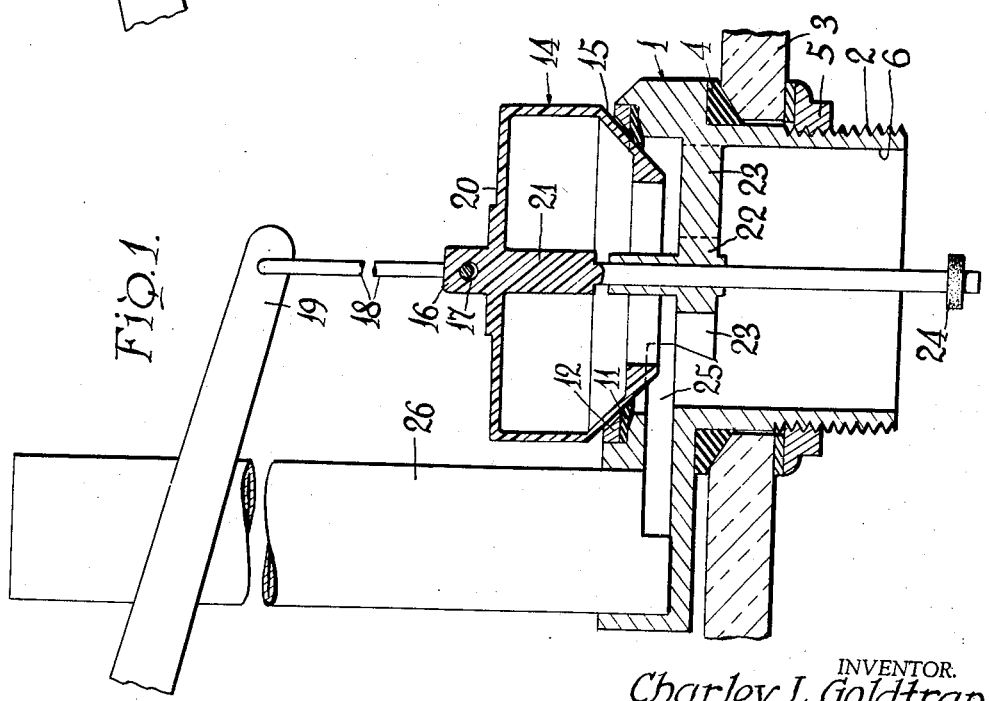
INVENTOR.
Charley L. Goldtrap,
BY
Beau, Brooks, Buckley & Beau.
ATTORNEYS.

United States Patent Office 2,904,794
Patented Sept. 22, 1959

2,904,794

TOILET FLUSH VALVE ASSEMBLY

Charley L. Goldtrap, Denver, Colo., assignor of one-third each to Dan Kamphausen, Littleton, and William W. Flenniken, Englewood, Colo.

Application August 19, 1957, Serial No. 678,813

1 Claim. (Cl. 4—57)

This invention relates to a new and useful toilet flush valve assembly.

The usual toilet flush valve construction employs a valve member movable toward and away from a valve seat and normally held thereagainst by the hydrostatic pressure of water in the tank. As a practical matter, exact alinement of the valve member with its seat cannot be maintained, even when guide means are provided, whereby heretofore such valve members commonly comprised a stopper ball of rubber or like resiliently flexible material to provide the requisite sealing action. Stopper balls wear unevenly and are subject to deterioration in use, with the eventual result that they no longer seat properly and must be replaced.

Accordingly, it is a primary object of my invention to provide a toilet flush valve assembly of a design providing the requisite sealing action in a mannner enabling utilization of a valve member far less subject to deterioration and distortion than the usual stopper ball.

It is another object of my invention to provide the foregoing in a toilet flush valve assembly which is relatively simple and inexpensive in construction, while being extremely durable and dependable in operation.

In one aspect thereof, a toilet flush valve assembly constructed in accord with my invention is characterized by the provision of a body having a flushing passage therethrough, a valve seat surrounding the flushing passage and having a beveled inner edge portion, a sealing gasket carried by said body to overlie said seat, the gasket being flexible toward and away from the beveled seat portion and being self-supporting in spaced relation thereto, a valve member movable toward and away from the seat and having a beveled lower edge portion for seating on the gasket and urging the same toward the beveled seat portion with the gasket flexing and conforming to the valve member for sealing thereagainst, the valve member normally being held against the gasket by the pressure of water in the toilet tank, and means for selectively lifting the valve member away from the gasket to open the flushing passage.

The foregoing and other objects, advantages and characterizing features of a toilet flush valve assembly constructed in accord with my invention will become clearly apparent from the ensuing detailed description of a presently preferred embodiment thereof, taken in conjunction with the accompanying drawing illustrating such embodiment wherein like reference numerals denote like parts throughout the various views and wherein:

Fig. 1 is a side view, partly in elevation and partly in section, of a toilet flush valve assembly of my invention, showing the same in closed position; and Fig. 2 is a similar view thereof, but with the valve member in open position.

Referring now in detail to the exemplary embodiment illustrated in the accompanying drawing, a toilet flush valve assembly of my invention comprises a body, generally designated 1, which can be of laminated construction. A nipple 2 depends from body 1 to extend through the bottom wall 3 of a toilet tank, with a sealing gasket 4 positioned between the under surface of body 1 and the tank bottom wall 3. A ring nut 5 is threaded on nipple 2 for bearing against the outer side of tank wall 3, to securely and releasably lock the assembly of my invention in position in the tank.

Body 1 is formed to provide an outlet or flushing passage 6 extending downwardly therethrough and through nipple 2, and at the upper end of passage 6 body 1 is formed to provide a valve seat 7 having a beveled inner edge portion 8. To accomplish this, the upper part of body 1 can be recessed, as indicated at 10, to provide the seat 7 and an annular gasket 11 of resilient, sealing material, such as rubber, is held in place on seat 7 as by an annular insert 12 fitted in recess 10 and held in place therein by suitable means.

It is a particular feature of my invention, for reasons to become apparent, that gasket member 11 is positioned on seat 7 to overlie portion 8 thereof, and that it is of a material having sufficient resilience to be self-supporting in a generally horizontal plane in spaced relation thereto. Preferably, sealing gasket 11 extends inwardly beyond the portion 8 and into passage 6, having an inner diameter less than that of passage 6 adjacent seat portion 8.

A valve member 14 of hollow, open bottom construction, for buoyancy, is provided with a beveled lower side edge portion 15 adapted to seat against gasket 11 and urge the same toward seat portion 8 under the hydrostatic pressure of water in the tank. On its top wall 20, valve memer 14 is formed with a boss 16 which can be apertured as at 17 to reecive a pull line 18 having connection to a lever 19 which is pivoted for movement up and down and actuated by the usual flushing lever on the exterior of the toilet tatnk, all in a manner well known in the art and therefore not illustrated herein.

A guide rod 21 depends from valve member 14, having connection with the inner surface of top wall 20 thereof, and extends down through an apertured hub 22 forming part of guide means comprising a spider having spokes 23 secured in outlet passage 6.

Body 1 is extended laterally in one direction, and is formed with a lateral passage 25 opening into outlet passage 6 at a point below valve seat 7, 8 and communicating with an overflow pipe 26 carried by body 1 in laterally offset relation to passage 6.

In operation, valve member 14 normally seats on gasket 11, flexing the same toward seat portion 8, and being held thereon by the hydrostatic pressure of water in the tank. When it is desired to flush the toilet, the usual handle is turned to lift lever 19 and thereby pull valve member 14 upwardly, lifting it away from gasket 11. This permits the water in the tank to pass through passage 6 and flush the toilet bowl in the usual manner.

The valve member 14 is buoyant, whereby once it is lifted from gasket 11 it floats in open position until the water in the tank has been discharged through passage 6 whereupon it closes against gasket 11. The guide means 21—23 serve to maintain valve member 14 aligned with valve seat 7, 8 for proper seating thereon.

There are several very unique and important advantages provided by this construction. The flexible gasket 11, normally spaced from the beveled valve seat portion 8, insures proper seating of and sealing against valve member 14, even though the latter is of a relatively non-flexible material, because the flexing action necessary to insure sealing engagement between the valve member and its seat is provided by the gasket 11. Therefore, it is not necessary to use a rubber stopper ball or the like, and the flexible, conforming gasket permits the use of a valve member of for example a plastic material which is much lighter in weight and generally not susceptible to corrosion and distortion. The valve member drops on a flexible seat gasket 11 whereby it is not subject to wear as in the case of the usual stopper ball, and the seal opens in the direction of water flow into and through outlet passage 6, thereby bending the sealing gasket 11 slightly inwardly in the proper direction to receive valve member 14 and insure proper seating thereof. The depending guide stem provides accurately controlled seating at all times, because of its close proximity to the valve seat, and such slight misalinement as might occur is automatically compensated for by the flexible gasket 11. Indeed, with the valve sealing arrangement of this invention the guide stem 21, which in any event has sufficient working clearance in hub 22 for sliding therein to permit valve member 14 to drop freely, can fit loosely in hub 22.

Accordingly, a toilet flush valve assembly of my invention is extremely dependable in operation, and it will be noted that the hollow lightweight float valve member 14 is very buoyant, whereby once it is lifted to dump the water in the tank it has a tendency to spring to full open position to float on the water being discharged. Line 18 preferably is flexible, to accommodate this action, and to avoid the problem of maintaining proper alinement, the flexible line permitting the valve to drop freely to its seat. The depending guide stem 21 is provided with a stop 24 adapted to about the bottom of hub 22 and thereby limit opening movement of valve member 14, and to absorb shock and noise otherwise resulting from such rapid opening movement at least one of the abutting surfaces is arranged to be of flexible shock absorbing material. Preferably the end stop 24 is fabricated of a suitable material for this purpose.

The various valve member and body parts, excepting the sealing gasket 11 and the stop 24, preferably are made of a plastic material, and are suitably bonded together. I find that plastic material is much to be preferred because it is not nearly as subject to corrosion as metal.

Accordingly, it is seen that my invention fully accomplishes the aforesaid objects, and while only one exemplary embodiment of my invention is disclosed and described in detail herein, it will be appreciated that I do not thereby intend to limit my invention. Instead, I realize that modifications and variations will occur to those skilled in the art without departing from the spirit of my invention and the scope of the appended claim.

Having fully disclosed and described my invention, together with its mode of operation, what I claim as new is as follows:

In combination with a toilet tank normally containing a head of water for flushing an associated toilet bowl, a flush valve assembly comprising, a body carried by said tank and having a flushing passage surrounded by a valve seat, an upstanding overflow pipe carried by said body in laterally offset relation to said flushing passage, said overflow pipe communicating with said flushing passage through a lateral passage opening into said flushing passage at a point below said valve seat, said valve seat having a beveled inner edge portion, a flexible sealing gasket carried by said body over said seat, said gasket being movable against said beveled seat portion and being self-supporting in spaced relaion thereto, a buoyant valve member having a beveled rigid lower edge portion for seating on said gasket and flexing it toward said seat portion to close said flushing passage under the hydrostatic pressure of such a head of water, means including a flexible line connected to said valve member for selectively lifting the same away from said valve seat to open said flushing passage, guide rod means depending from said valve member, guide means positioned in said flushing passage below said valve seat for slidably receiving said rod means, and stop means carried by said rod means for abutting said guide means and limiting lifting movement of said valve member away from said valve seat, said stop means on said rod means being cushioned with flexible shock absorbing material.

References Cited in the file of this patent

UNITED STATES PATENTS

| | | |
|---|---|---|
| 1,177,443 | Pickles | Mar. 28, 1916 |
| 1,237,109 | Shoppe | Aug. 14, 1917 |
| 1,420,452 | Shoppe et al. | June 20, 1922 |
| 1,439,268 | Shoppe et al. | Dec. 19, 1922 |
| 1,753,997 | Opperman | Apr. 8, 1930 |
| 1,904,898 | Kennedy | Apr. 18, 1933 |
| 2,597,474 | Griffith | May 20, 1952 |
| 2,614,263 | Kass | Oct. 21, 1952 |
| 2,778,028 | Weiner | Jan. 22, 1957 |
| 2,832,963 | Minnella | May 6, 1958 |

FOREIGN PATENTS

| | | |
|---|---|---|
| 16,145 | Great Britain | Dec. 31, 1909 |